UNITED STATES PATENT OFFICE.

WILLIAM McCAINE, OF ST. PAUL, MINNESOTA, ASSIGNOR TO DAVID McCAINE AND DANIEL McCAINE, OF SAME PLACE, ONE-THIRD TO EACH.

IMPROVEMENT IN PROCESSES FOR TREATING PYROXYLINE.

Specification forming part of Letters Patent No. 217,232, dated July 8, 1879; application filed December 18, 1878.

*To all whom it may concern:*

Be it known that I, WILLIAM MCCAINE, of St. Paul, in the county of Ramsey and State of Minnesota, have made certain new and useful Improvements in Processes for the Treatment of Pyroxyline, which improvement is fully set forth in the following specification.

This invention or discovery relates to the treatment of pyroxyline or gun-cotton; and consists in first dissolving or transforming it into a liquid by the application of suitable solvents and then casting it into porous molds of any desired form, and without heat or pressure, as hereinafter set forth.

The invention further consists in treating the compound thus formed with alcohol to render it plastic, so that it may be pressed into any desired form, and then immersing it in olive-oil, or its equivalent, to hasten the hardening, as hereinafter set forth.

In the ordinary treatment of this substance heat is used to assist in reducing it to a plastic consistency, so that it can be molded into the required form by pressure; but, so far as I am aware, no method has heretofore been discovered whereby it is reduced to a liquid consistency without heat and then run into molds without pressure and there allowed to set.

To accomplish this result I first take to about one (1) ounce of sulphuric ether one (1) ounce camphor-gum, and dissolve it therein. I then add to this solution as much pyroxyline as it will take up. This will produce a sponge-like mass of about the consistency of cold glue. I then introduce spirits of turpentine, or its equivalent, of about equal bulk to the mass, or a sufficient quantity to reduce it to a liquid. This liquid is then cast into molds made of plaster-of-paris or other suitable porous material, where the most of the turpentine will strain through, and carrying with it nearly all of the camphor, but leaving the pyroxyline in the mold, along with a small percentage of the turpentine, camphor, &c. This running off of the turpentine, of course, reduces the mass nearly, if not quite, one-half in bulk; and then there is a still further reduction or shrinkage after the product is hard enough to be removed from the molds, caused by the evaporation of the turpentine, camphor, and other liquids still remaining. All of these manipulations of the substance are done without the use of heat or pressure.

The pyroxyline could be dissolved without the use of the camphor; but, if no camphor is used, when the turpentine is added the pyroxyline is precipitated in disintegrated particles; but the camphor serves to hold the particles together in one homogeneous mass, and causes the liquids to pass off and leave it in that state.

I am aware that it is not new to use camphor in the treatment of pyroxyline; but heretofore it has only been used as a latent solvent, which is made active by the application of heat.

It is well known that camphor is a solvent of pyroxyline only when subjected to a high degree of heat; but, as I use no heat in my process, I do not use the camphor as a solvent, but simply to hold the particles of the pyroxyline together, and allow the turpentine and other liquids to pass off through the pores of the mold, leaving the pyroxyline in a homogeneous transparent mass.

By this method of treating the pyroxyline I am enabled to dispense with all apparatus for heating and pressing it, while at the same time I produce a substance in every way equal to that produced by any other method with which I am acquainted.

Another advantage of this method of treating the pyroxyline is that by reducing it to a liquid I am enabled to use aniline dies in coloring it of any desired shade. This cannot be done when the pyroxyline is in a plastic or semi-liquid state. After the pyroxyline thus formed is hard enough to enable it to be removed from the molds, which will be in three or four days, according to the size of the articles, it may be treated to alcohol for a sufficient length of time to become saturated and rendered slightly plastic, and then compressed to a limited extent into any other desired form. The articles will then be immersed in olive-oil, or any other equivalent substance, and allowed to stand until again hardened.

The treatment by oil is not a necessary part of the process, but greatly hastens the hardening. In these two latter processes—viz., treating by alcohol and oil—the ingredients are used cold.

Having thus described my invention, what I claim as new, and desire to secure by Letters Patent, is—

1. The process hereinbefore described for treating pyroxyline or gun-cotton, consisting of first reducing it to a liquid by suitable solvents, and without the application of heat or pressure, and then casting it into porous molds, substantially as set forth.

2. Treating pyroxyline or its compounds with spirits of turpentine or its equivalent, in the manner and for the purpose hereinbefore set forth.

3. Treating the compound thus formed with alcohol, and afterward with olive-oil or its equivalents, in the manner and for the purpose as hereinbefore set forth.

In testimony whereof I have hereunto set my hand in the presence of two subscribing witnesses.

WILLIAM McCAINE.

Witnesses:
 C. N. WOODWARD,
 LOUIS FEESER.